US007131652B2

(12) United States Patent
Ramsey

(10) Patent No.: US 7,131,652 B2
(45) Date of Patent: Nov. 7, 2006

(54) STEERING DAMPER AND BACKUP LOCK BEAM ATTACHMENT

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 325 days.

(21) Appl. No.: 10/683,634

(22) Filed: Oct. 10, 2003

(65) Prior Publication Data

US 2004/0084866 A1   May 6, 2004

Related U.S. Application Data

(60) Provisional application No. 60/422,464, filed on Oct. 30, 2002.

(51) Int. Cl.
*B62D 61/12* (2006.01)

(52) U.S. Cl. ................... 280/86.5; 280/124.153

(58) Field of Classification Search ............... 280/86.5, 280/89, 124.128, 124.153
See application file for complete search history.

(56) References Cited

U.S. PATENT DOCUMENTS

| 4,010,813 A | 3/1977 | Quigniot | |
| 4,506,910 A * | 3/1985 | Bierens | ............... 280/124.116 |
| 4,925,165 A | 5/1990 | Sketo | |
| 5,366,237 A * | 11/1994 | Dilling et al. | ........ 280/124.116 |
| 6,007,078 A * | 12/1999 | Gottschalk et al. | .... 280/86.751 |
| 6,073,946 A * | 6/2000 | Richardson | ................ 280/86.5 |
| 2004/0256820 A1 * | 12/2004 | Chalin et al. | ............. 280/86.5 |

FOREIGN PATENT DOCUMENTS

| DE | 1655138 A | 10/1971 |
| EP | 0747281 A | 11/1996 |
| FR | 2335359 A | 7/1977 |

* cited by examiner

*Primary Examiner*—Paul N. Dickson
*Assistant Examiner*—Leonard J. McCreary, Jr.
(74) *Attorney, Agent, or Firm*—Buckingham Doolittle & Burroughs, LLP; David P. Dureska; Brent L. Moore

(57) ABSTRACT

A steerable lift axle/suspension system for a heavy-duty vehicle such as a semi-trailer or a straight truck, includes a pair of steering dampers and a backup lock. The steering dampers minimize shimmy of the steerable wheels during over-the-road operation of the vehicle, and straighten the wheels on such steerable axle/suspension systems having a lift feature when the system is raised. The backup lock secures the wheels in a straightened position when such liftable systems are raised and the vehicle is backing up, to minimize vehicle handling problems. The steering dampers and backup lock are mounted at a location off the axle tube of the axle and on the axle/suspension system beams, to eliminate stress on the axle that would otherwise be caused by welded attachment of such components to the axle tube, thereby enabling use of a less robust, more lightweight axle tube.

7 Claims, 5 Drawing Sheets

STEERING DAMPER AND BACKUP LOCK BEAM ATTACHMENT

CROSS-REFERENCE TO RELATED APPLICATION

This application claims the benefit of U.S. Provisional Patent Application Ser. No. 60/422,464, filed Oct. 30, 2002.

BACKGROUND OF THE INVENTION

1. Technical Field

The invention relates to semi-trailers, and in particular to the steerable lift axle/suspension systems of the trailer of a semi-trailer. More particularly, the invention relates to the mounting of steering dampers and a backup lock on the suspension assembly beams rather than on the axle.

2. Background Art

Prior art steerable lift axle/suspension systems of semi-trailers or tractor-trailers typically have the steering dampers and the backup lock of the system mounted directly on the axle and, specifically, on the central axle tube portion of the axle which generally is located inboard from each of the suspension assembly beams. Manufacturers of steerable lift axles typically supply and assemble special brackets for mounting these components directly on their axle, then mount suspension assemblies on the axle or, alternatively, sell the axle to trailer builders who then mount the suspension assemblies on the axle. This practice either causes the steerable axle manufacturer or the trailer builder to become heavily involved in suspension assembly geometry layout work. Many problems and/or limitations often result from this manufacturing arrangement because axle manufacturers and trailer builders typically have less then complete familiarity with the complexities of suspension assembly design.

The present invention solves the noted problems by mounting the steering dampers and the backup lock on the suspension assembly beams via support brackets rather than on the axle tube. By locating these components on the suspension beams rather than on the axle, stresses to the axle caused by mounting components or brackets thereon also are eliminated. Eliminating such stresses, in turn, eliminates the possibility of axle tube failures caused by those stresses. To compensate for such stresses, axle manufacturers heretofore have made the walls of steerable suspension axle tubes thicker, with the undesirable result of adding weight to the vehicle.

The present invention also enables the suspension manufacturer to be more completely involved in the design of the overall axle/suspension system, Which results in improved performance characteristics, more compact design, ease of installation, and reduced weight. It also benefits the end user because the user can turn to one supplier, that is, the suspension manufacturer, rather than many suppliers, including axle and trailer manufacturers, to service the system.

In addition, the location of the component mounting brackets on the inboard side of the, suspension beams by bolt attachment is advantageous because, if a problem occurs with the components or brackets, new parts can be obtained and the defective parts easily replaced or repaired. In the past, problems with the brackets or the mounted components also could cause damage to the axle tube, resulting in the need to replace the entire axle. Such repairs are expensive and time-consuming because they involve much cutting, welding, and fixturing.

SUMMARY OF THE INVENTION

Objectives of the present invention include providing an alternative mounting location for the steering dampers and the backup lock of a semi-trailer steerable lift axle/suspension system, thereby avoiding mounting of those components on the axle arid eliminating the possibility of axle tube failures caused by the stresses of the axle mounting location.

Another objective of the present invention includes providing for the use of axle tubes having thinner walls and lighter weight.

A further objective of the present invention is to enable suspension manufacturers to design the overall axle/suspension system.

Yet another objective of the present invention is to enable end users of axle/suspension systems to utilize a single supplier for servicing the system.

Still another objective of the present invention is to enable easy repair or replacement of the steering dampers and backup lock and their mounting brackets, without requiring repair or replacement of other components such as the axle.

A still further objective of the present invention is to provide an alternative mounting location for the steering dampers and backup lock which is reliable in operation and cost effective.

These objectives and advantages are obtained by the steerable axle/suspension system for a vehicle, the system including a pair of transversely-spaced suspension assemblies, each one of the assemblies including a longitudinally extending elongated beam, a first end of the beam being attached to the vehicle frame to enable generally pivotal movement of the beam, an air spring extending between and being attached to a second end of the beam and the frame, an axle of the system including a central tube portion having a pair of ends being captured by and disposed substantially between the beams, and a pair of steering assemblies mounted on the axle tube ends, each one of the steering assemblies extending outboardly from a respective one of the beams, and a pair of axle spindles mounted on the steering assemblies and extending outboardly from the steering assemblies, each one of the steering assemblies being operatively connected to a respective one of a pair of ends of a transversely extending tie rod, wherein the improvement includes a pair of steering dampers, each one of the dampers having an outboard end and an inboard end, wherein an outboard end of each one of the steering dampers is operatively connected to a respective one of the steering assemblies and an inboard end of the damper is mounted on a respective one of a pair of brackets, the brackets each being mounted on the beams.

BRIEF DESCRIPTION OF THE DRAWINGS

The preferred embodiment of the present invention, illustrative of the best mode in which the applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
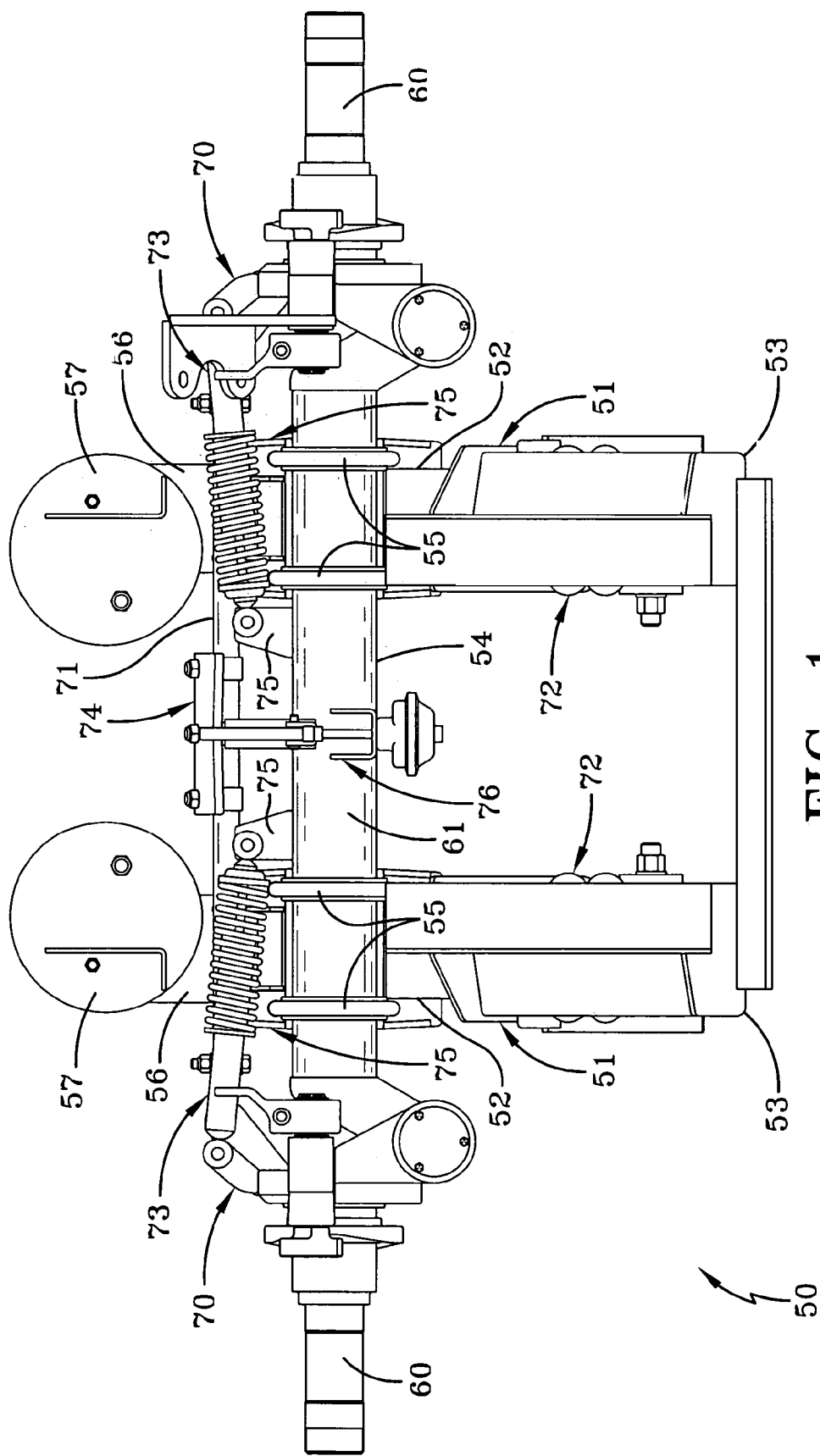
FIG. 1 is a top plan view of a prior art steerable lift axle/suspension system, showing the steering dampers and backup lock mounted on the axle of the system via brackets welded to the axle.

The steerable lift axle/suspension system including the steering damper and backup lock beam attachment of the present invention is shown in FIGS. 2–5. However, so that the environment in which the present invention is utilized can be best understood, a prior art semi-trailer steerable. lift axle/suspension system having steering dampers and a backup lock mounted on the axle of the system is shown in FIG. 1.

Prior art steerable lift axle/suspension system is indicated generally at 50 in FIG. 1 and includes a pair of suspension assemblies 51, only one of which will be described herein, inasmuch as each one of the suspension assemblies generally is identical. Suspension assembly 51 includes a trailing arm-type beam 52 that is pivotally mounted on a hanger 53 in a manner well known in the heavy-duty vehicle suspension art. Hanger 53, in turn, is mounted on the underside of a trailer frame (not shown) and extends downwardly therefrom. Beam 52 is elongated and extends aft or rearwardly from hanger 53, and an axle 54 is captured by U-bolts 55 in cutouts (not shown) formed in the transversely spaced beams 52. A shock absorber (not shown) typically is mounted on and extends between hanger 53 and beam 52 in a manner well known in the art. A cantilever extension 56 of beam 52 extends rearwardly beyond axle 54 and supports an air spring 57, which is mounted on and extends between the beam extension and the trailer frame.

Axle 54 includes a central axle tube 61 (FIG. 1), and a steering assembly 70, which is well known in the heavy-duty vehicle steerable axle/suspension system art, is mounted on each end of axle tube 61 outboardly from beams 52. An axle spindle 60, in turn, is mounted on each steering assembly 70, in alignment with axle tube 61, and extends outboardly therefrom. A brake assembly (not shown) of a type which commonly is known in the heavy-duty vehicle braking art is mounted on and beneath each steering assembly 70. A tie rod 71 is operatively connected to and extends between each steering assembly 70. A pneumatic lift assembly 72 is mounted on each frame hanger 53 and beam 52 to enable lifting of the entire axle/suspension system 50 when it is advantageous for the vehicle operator to do so, such as when the trailer is carrying less cargo or during operation of the vehicle in the reverse or backup direction.

Most steerable lift axle/suspension systems such as system 50 utilize a pair of steering dampers 73 and a single backup lock assembly 74. As shown in FIG. 1, each steering damper is operatively connected to steering assembly 70 and further is mounted on axle tube 61 via a bracket 75. Backup lock assembly 74 is mounted on tie rod 71 and further is mounted on axle tube 61 via a bracket 76. As discussed hereinabove, the mounting of steering dampers 73 and backup lock assembly 74 on axle 54 is undesirable since brackets 75 and 76, respectively, must each be welded to axle tube 61, and such attachment of structures on the axle tube can cause various problems. For example, during operation of the vehicle, stress risers occur at the welds (not shown) where brackets 75, 76 are attached to axle tube 61. Thus, a much thicker axle tube 61 is necessary to prevent or minimize axle tube failures caused by such stresses, which adds undesirable weight to the vehicle.

Moreover, the location of steering dampers 73 and backup lock assembly 74 on axle 54 typically means that axle manufacturers or trailer builders mounted these components on the axle. Consequently, the axle manufacturer or the trailer builder has to become involved in suspension assembly geometry layout work, and they typically have less than complete familiarity with this design area. Also, if a problem occurs with steering damper 73, backup lock assembly 74, or brackets 75, 76 in prior art steerable lift axle/suspension system 50,repair or replacement of the components can cause damage to axle tube 61, resulting in the need to replace the entire axle 54. Such repairs are expensive and time consuming due to involving much cutting, welding, and fixturing. Also, in the event such repair or replacement is necessary, the end user may have to look to various suppliers, typically the trailer manufacturer and/or the axle manufacturer, to fix the problem, depending on which manufacturer mounted steering dampers 73 and backup lock assembly 74 on axle 54.

It is understood that prior art steerable lift axle/suspension system 50 merely is illustrative of one type of prior art system having steering dampers and a backup lock mounted on the axle, and of the environment in which the steering damper and backup lock beam attachment of the present invention to be described immediately below can be used. It is understood that steering dampers 73 and backup lock assemblies 74 can be utilized in other heavy-duty vehicle applications besides semi-trailers, such as straight trucks. It also is understood that steering dampers could be utilized on non-lift steerable axle/suspension systems, which would not include a backup lock. It is further understood that lift and non-lift steerable axle/suspension systems which utilize steering dampers and backup locks have various other configurations, including other styles of beams, including leading arm type beams. Finally, it is understood that other types or styles of steering dampers and backup lock assemblies are known in the art. These include steering assembly centering devices that use air bags rather than steering dampers 73 having coil springs as shown in FIG. 1. However, the concepts of the present invention apply to such other types of steering dampers and backup lock assemblies.

The above-described prior art problems have been solved or minimized by the steerable lift axle/suspension system of the present invention, which is indicated generally at 10 in FIGS. 2–5. It is understood that the concepts of the present invention can be applied to steerable axle/suspension system types other than those shown in FIG. 2, such as those having different types of beams and/or backup lock assemblies and/or steering dampers, non-lift steerable axle/suspension systems lacking a backup lock altogether, and steerable axle/suspension systems used on heavy-duty vehicles other than semi-trailers, such as straight trucks, without affecting the overall concept of the present invention, which is directed to the manner of mounting the steering dampers and backup lock on the axle/suspension system.

Specifically, semi-trailer steerable lift axle/suspension system 10 includes a pair of suspension assemblies 11, only one of which will be described in detail herein, inasmuch as each one of the suspension assemblies is generally identical. Suspension assembly 11 includes a trailing arm-type elongated beam 12 that is pivotally mounted on a hanger 13 in a manner well known in the heavy-duty vehicle suspension art. Hanger 13, in turn, is mounted on the underside of a trailer frame (not shown) and extends downwardly therefrom. Beam 12 extends rearwardly or aft from hanger 13, and an axle 14 passes through and is captured in openings 31 (FIG. 5) formed in the transversely spaced beams. A shock absorber 15 is mounted on and extends between hanger 13 and beam 12 in a usual manner. A cantilever extension 16 of beam 12 extends aft or rearwardly beyond axle 14 and supports an air spring 17 which is mounted on and extends between the beam extension and the trailer frame.

Figure 2:
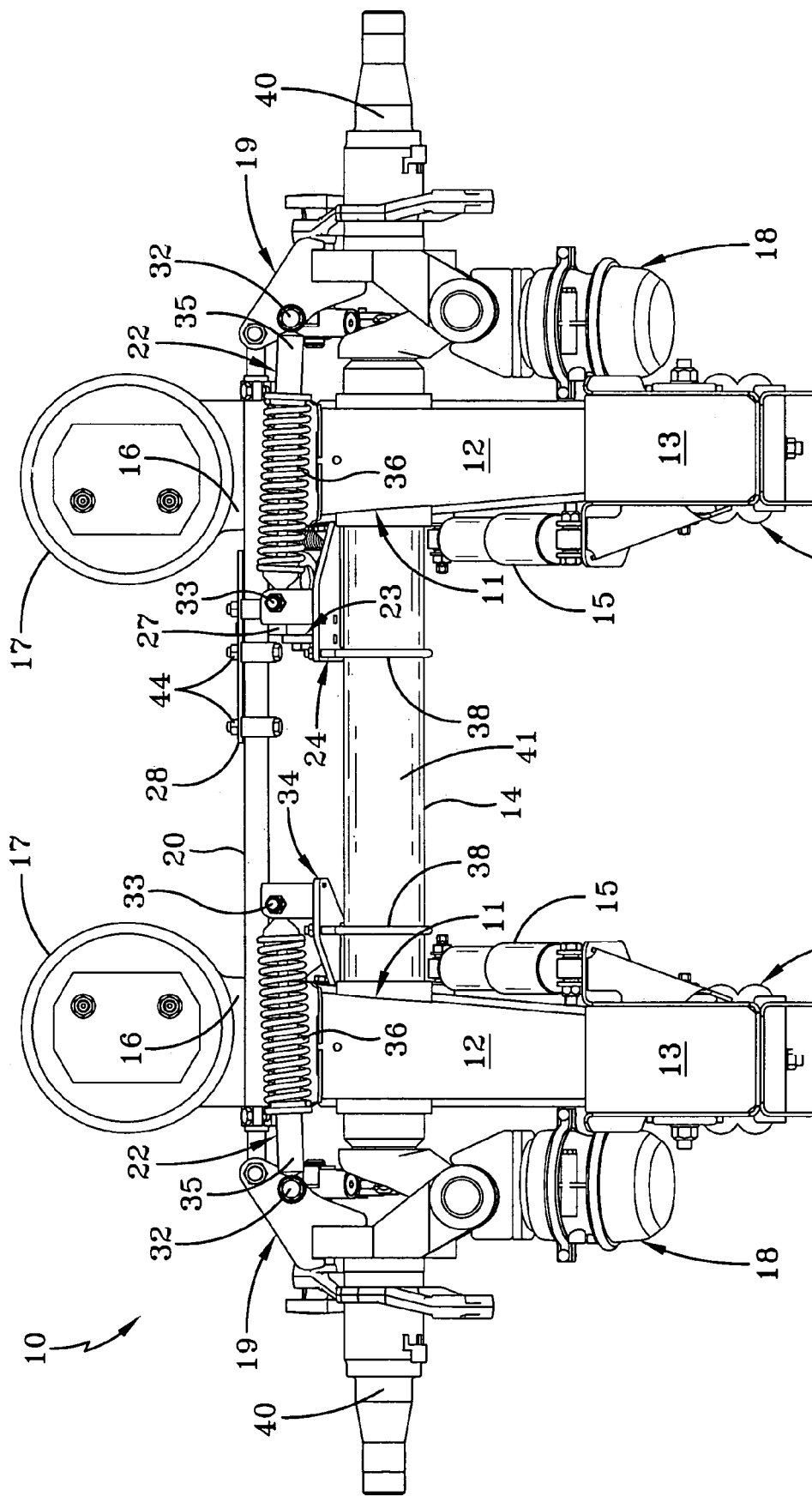
FIG. 2 is a top plan view of a steerable lift axle/suspension system of the present invention, having the steering dampers and backup lock mounted on the beams of the suspension assemblies.
Figure 5:
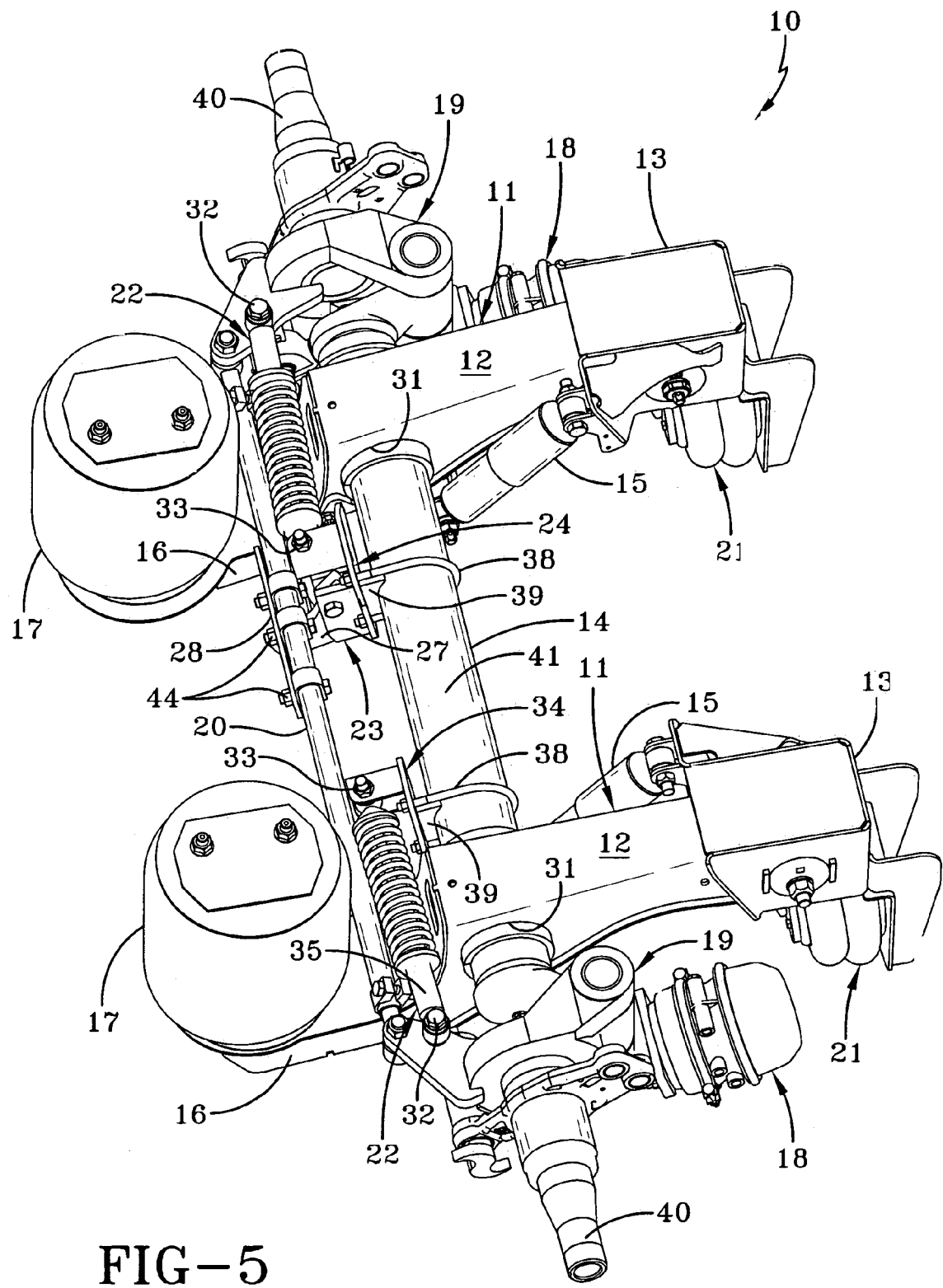
FIG. 5 is a top curbside perspective view of the axle/suspension system shown in FIGS. 2–4.

Axle 14 includes a central axle tube 41, and a steering assembly 19, which is well known in the heavy-duty vehicle steerable axle/suspension system art, is mounted on each end of axle tube 41 outboardly from beams 12. An axle spindle 40, in turn, is mounted on each steering assembly 19, in alignment with axle tube 41, and extends outboardly therefrom (FIGS. 2 and 5). A brake assembly 18 of a type which is well known in the heavy-duty vehicle braking art is mounted on and beneath each steering assembly 19. A tie rod 20 is operatively connected to and extends between each steering assembly 19. A pneumatic lift assembly 21 is mounted on frame hanger 13 and beam 12 to enable lifting of the entire axle/suspension system 10 when it is advantageous for the vehicle operator to do so, such as when the trailer is carrying less cargo or during operation of the vehicle in the reverse or backup direction.

Most steerable lift axle/suspension systems such as system 10 utilize, a pair of steering dampers 22 and a single backup lock assembly 23. As noted hereinabove, steering dampers 22 and backup lock assembly 23 traditionally have been mounted on axle tube 41 via some type of attachment or bracket that is welded to the tube, with the adverse, consequences of such axle mounting having been described in detail hereinabove.

Figure 3:
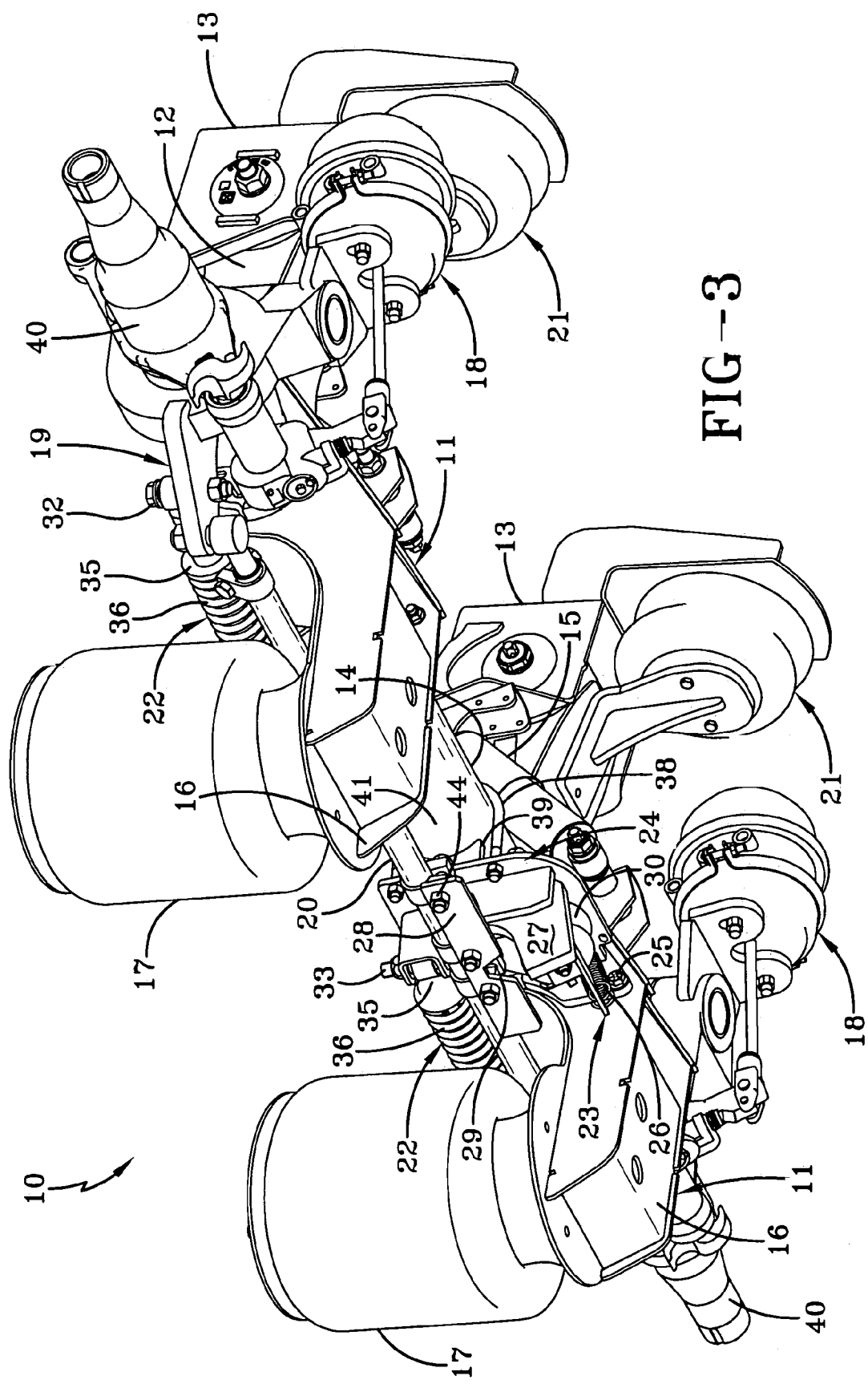
FIG. 3 is a bottom rear curbside perspective view of the axle/suspension system shown in FIG. 2.
Figure 4:
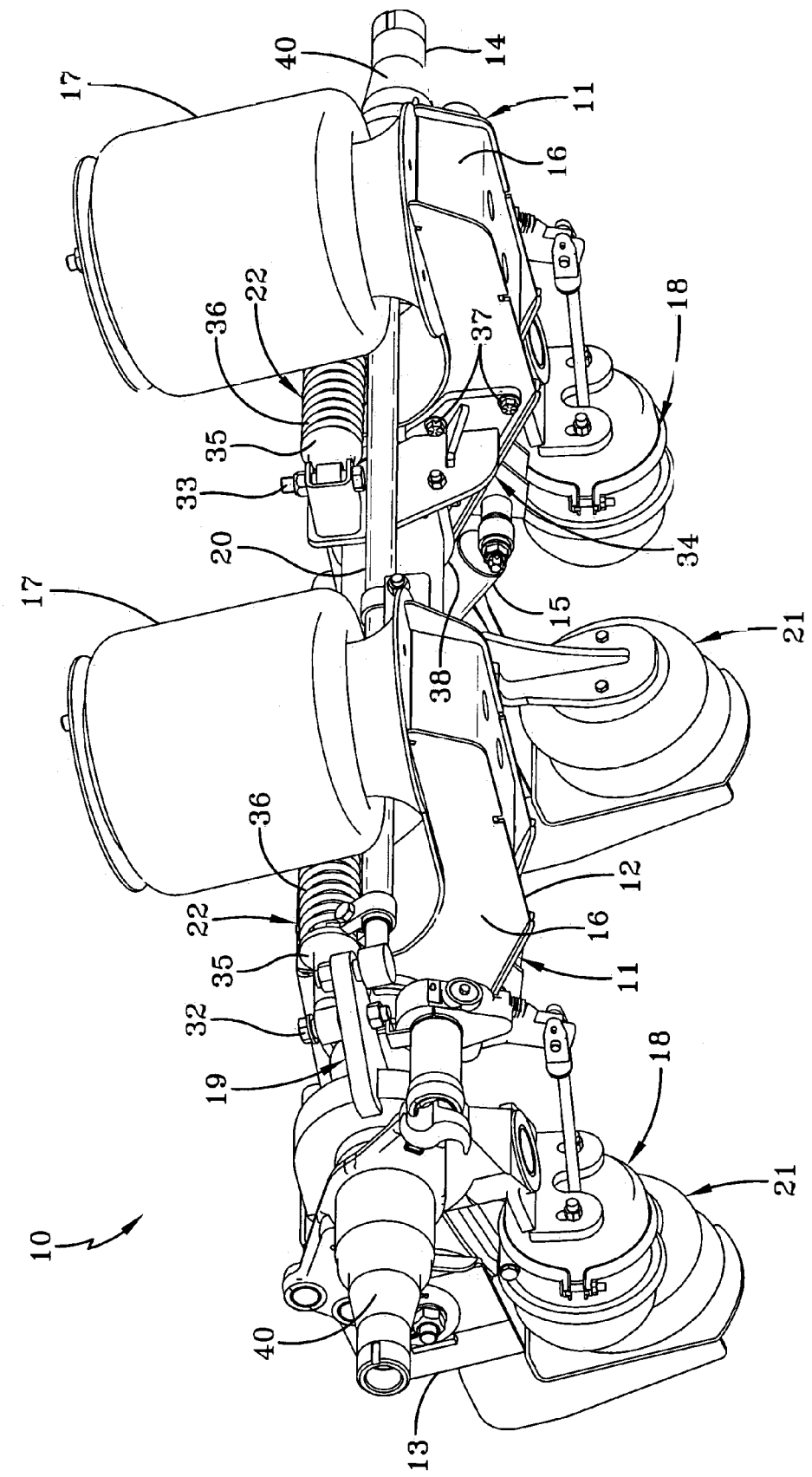
FIG. 4 is a bottom rear driver's side perspective view of the axle/suspension system shown in FIGS. 2 and 3.

In accordance with one of the key features of the present invention, rather than mounting steering dampers 22 and backup lock assembly 23 on axle tube 41, a first bracket 24 is configured for attachment of the driver's side steering damper 22 and backup lock assembly 23 to driver's side beam 12. More particularly, first bracket 24 is mounted directly on the inboard sidewall of driver's side beam 12 using fasteners such as bolts 25 (FIG. 3). A second bracket 34 configured for attachment of the curbside steering damper 22 similarly is attached to the curbside beam 12 via fasteners such as bolts 37 (FIG. 4). Each steering damper 22, in turn, is mounted at its outboard end to its respective steering assembly 19 and at its inboard end to its respective bracket 24, 34, by usual fastening means such as bolts 32, 33, respectively. In addition, backup lock assembly 23 also is mounted on driver's side first bracket 24 via usual fastening means such as bolts (not shown). A spacer 39 is disposed between each bracket 24, 34 and axle tube 41 (FIG. 5), and a pair of U-bolts 38 are placed about the axle tube. Each U-bolt 38 is aligned with a respective one of brackets 24, 34 and its respective spacer. 39, and secured to the bracket in a usual manner. Each U-bolt 38 is tightened sufficiently to capture spacer 39 between its respective bracket 24, 34 and axle tube 41. This arrangement of parts minimizes unwanted movement or shimmy of brackets 24, 34 during operation of the vehicle. It is important to note that U-bolts 38 and spacers 39 are not welded on the axle tube 41, but merely abut the tube. Since no structure such as brackets 75, 76 shown in prior art FIG. 1 are welded on axle tube 41, the tube used with the present invention can have a thinner wall thickness than is required in many prior art designs such as axle tube 61 of FIG. 1. For example, prior art axle tube 61 might have a wall thickness of about fifteen/sixteenths ($^{15}/_{16}$) of an inch, while axle tube 41, useful in the present invention, might have a wall thickness of only about eleven/sixteenths ($^{11}/_{16}$) of an inch.

As is well known in the steering art, a shock absorber component 35 of each steering. damper 22, which is similar to a typical shock absorber, functions to minimize side-to-side shimmy of the vehicle wheels (not shown) mounted on the end of each axle spindle 40 during over-the-road operation of the vehicle. Coil spring component 36 of damper 22 is disposed about shock absorber component 35 and is biased in the outboard direction to cause steering assembly 19 to generally align axle spindles 40 with axle tube 41 and maintain the wheels in a fore-aft straightened condition in a manner well known in the art whenever axle/suspension system 10 is raised to a lifted position by pneumatic lift assemblies 21 and the vehicle is traveling over-the-road. Such alignment minimizes unwanted drag on the vehicle, which can result in increased fuel costs and the like.

Backup lock assembly 23 is utilized when axle/suspension system 10 is in the lifted position and the vehicle is backing up or moving in reverse. More particularly, a coil return spring 26 (FIG. 3) of assembly 23 is biased to maintain a lock 27 in its downwardmost and unlocked position which in turn allows tie rod 20 to move freely from side-to-side when steering assemblies 19 pivot during forward vehicle operation. However, when axle/suspension'system 10 is in the lifted or raised position and the vehicle is backing up or moving in reverse, it is desirable to lock tie rod 20 and attached steering assemblies 19. Thus, a bracket 28 is mounted on tie rod 20 adjacent to lock 27 by any suitable means such as bolts 44, and is formed with a slot 29 for positive locking engagement with lock 27. Locking slot 29 is located relative to lock 27 so that when they are engaged, axle spindles 40 generally are aligned with axle tube 41 and the wheels are straight in the fore-aft direction, thus minimizing the possibility that the vehicle wheels will be turned during backing up of the vehicle which can cause vehicle handling problems.

More specifically, when axle/suspension system 10 is lifted by lift assemblies 21 and the vehicle is in reverse, a pneumatic air bag 30 (FIG. 3) is filled with compressed air (not shown), and pivots lock 27 upwardly into slot 29 against the bias of spring 26 to lock steering assemblies 19 in place in the straightened position shown in FIGS. 2 through 5. This design of pivoting lock 27 and actuating pneumatic bag 30 also is novel in that the bag, which is a small automotive-type air actuator, overcomes the bias of small coil return spring 26 to activate the lock to engage tie rod bracket 28 in slot 29, and when the air bag is deflated, spring 26 moves to its biased position to unlock assembly 23. Heretofore, more expensive and heavy brake chambers were commonly used to provide this locking/unlocking function. It is understood that bracket 24 for mounting a steering damper 22 and backup lock assembly 23 could be mounted on curbside beam 12 and that bracket 34 for mounting only a steering damper 22 could be mounted on driver's side beam 12, without affecting the overall concept of the present invention.

It is understood that the present invention steerable lift axle/suspension system could be utilized in heavy-duty vehicle applications other than semi-trailers, such as on straight trucks. The concepts of the present invention also could be applied to non-lift steerable axle/suspension systems, which do not include a backup lock, for mounting steering dampers at a location other than the axle. It is further understood that the present invention can be utilized on various types of steerable axle/suspension systems having various styles of beams, including leading arm, trailing aim, top mount, and bottom mount, without affecting the overall concept of the invention. Finally, it is understood that the concepts of the present invention could be applied to steering dampers, backup lock assemblies, and axle-centering devices other than dampers 22 and backup lock assembly 23 shown in FIGS. 2–5.

Thus, the steering damper and backup lock beam attachment for steerable lift axle/suspension systems achieves various objectives not heretofore seen in prior art steerable axle/suspension systems, including providing an alternative mounting location for, the steering dampers and the backup lock assembly of the system, thereby eliminating the possibility of axle tube failures caused by the stresses of an axle mounting location commonly seen in prior art systems, and enabling use of thinner walled and therefore lighter axle tubes. The present invention also enables suspension manufacturers to design the overall axle/suspension system which, in turn, enables end users of the steerable axle/suspension systems to utilize a single supplier for servicing the system. The mounting of the steering dampers and backup lock assembly off of the axle facilitates easy repair or replacement of the dampers and lock assembly and their mounting brackets, without requiring repair or replacement of other components such as the axle. Thus, the steerable axle/suspension system of the present invention provides a durable and cost effective alternative to prior art steerable axle/suspension systems which mount the steering dampers and backup lock assembly on the axle.

Accordingly, the steering damper and backup lock beam attachment is simplified, provides an effective, safe, inexpensive and efficient structure and method which achieves all the enumerated objectives, provides for eliminating difficulties encountered with prior steering damper and backup lock axle attachments, and solves problems and obtains new results in the heavy-duty vehicle steerable axle/suspension system art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Moreover, the description and illustration of the invention is by way of example, and the scope of the invention is not limited to the exact details shown or described.

Having now described the features, discoveries and principles of the invention, the manner in which the steering damper and backup lock beam attachment is used and installed, the characteristics of the construction and arrangement, and the advantageous, new and useful results obtained; the new and useful structures, processes, devices, elements, arrangements, parts and combinations are set forth in the appended claims.

What is claimed is:

1. A steerable axle/suspension system for a vehicle, said system including a pair of transversely-spaced suspension assemblies, each one of said assemblies including a longitudinally extending elongated beam, a first end of said beam being attached to said vehicle frame to enable generally pivotal movement of said beam, an air spring extending between and being attached to a second end of the beam and the frame, an axle of the system including a central tube portion having a pair of ends being captured by and disposed substantially between said beams, and a pair of steering assemblies mounted on said axle ends, each one of said steering assemblies extending outboardly from a respective one of the beams, and a pair of axle spindles mounted on the steering assemblies and extending outboardly from said steering assemblies, each one of said steering assemblies being operatively connected to a respective one of a pair of ends of a transversely extending tie rod, wherein the improvement comprises:

a pair of steering dampers, each one of said dampers having an outboard end and an inboard end, wherein an outboard end of each one of the steering dampers is operatively connected to a respective one of said steering assemblies and an inboard end of said damper is mounted on a respective one of a pair of beam brackets, said beam brackets each being mounted directly on said beams.

2. The improved steerable axle/suspension system of claim 1, in which each one of said suspension assemblies includes a pneumatic lift assembly; in which each one of said steering dampers includes an outboardly-biased coil spring for causing its respective steering assembly to maintain its respective axle spindle substantially in alignment with said central axle tube during over-the-road operation of the vehicle and when said axle/suspension system is in a lifted position; and in which a backup lock assembly is mounted on a selected one of said beam brackets for locking said tie rod in a predetermined transverse position, thereby causing the attached steering assemblies to maintain said axle spindles substantially in alignment with the axle tube when said vehicle is backing up and when said axle/suspension system is in a lifted position.

3. The improved steerable axle/suspension system of claim 2, in which said backup lock assembly includes a bracket formed with a locking slot mounted on said tie rod; in which a lock is mounted on said selected one of said beam brackets; in which said lock is biased by a coil spring to an unlocked position when an air bag of said assembly is deflated; and in which upon inflation of said air bag with compressed air, said lock overcomes said spring bias and engages said locking slot to cause said steering assemblies to maintain said axle spindles substantially in alignment with said axle tube during said backup operation of the vehicle and when said axle/suspension system is in a lifted position.

4. The improved steerable axle/suspension system of claim 1, in which a spacer is disposed between each one of said beam brackets and said axle tube; in which a pair of U-bolts are disposed about said axle tube, in which each one of said U-bolts is aligned with respective ones of said spacers and said beam brackets; and in which each one of the U-bolts is fastened to its respective one of the beam brackets, whereby said spacer is captured between and abuts said beam bracket and said axle tube to stabilize the beam bracket.

5. The improved steerable axle/suspension system of claim 1, in which each one of said beam first ends is pivotally mounted on a hanger; and in which said hanger is mounted on and depends from said vehicle frame.

6. The improved steerable axle/suspension system of claim 5, in which a shock absorber extends between and is mounted on each one of said hangers and its respective one of said beams; and in which a brake assembly is mounted on and beneath each one of said steering assemblies.

7. A steerable axle/suspension system for a vehicle, said system including a pair of transversely-spaced suspension assemblies, each one of said assemblies including a longitudinally extending elongated beam, a first end of said beam being attached to said vehicle frame to enable generally pivotal movement of said beam, an air spring extending between and being attached to a second end of the beam and the frame, an axle of the system including a central tube portion having a pair of ends being captured by and disposed substantially between said beams, and a pair of steering assemblies mounted on said axle ends, each one of said steering assemblies extending outboardly from a respective one of the beams, and a pair of axle spindles mounted on the steering assemblies and extending outboardly from said steering assemblies, each one of said steering assemblies being operatively connected to a respective one of a pair of ends of a transversely extending tie rod, wherein the improvement comprises:

a pair of steering dampers, each one of said dampers having an outboard end and an inboard end, wherein an outboard end of each one of the steering dampers is operatively connected to a respective one of said steering assemblies and an inboard end of said damper is mounted on a respective one of a pair of beam brackets, said beam brackets each being mounted on said beams, each one of said suspension assemblies including a pneumatic lift assembly, said steering dampers each including an outboardly-biased coil spring for causing its respective steering assembly to maintain its respective axle spindle substantially in alignment with said central axle tube during over-the-road operation of the vehicle and when said axle/suspension system is in a lifted position;

a backup lock assembly being mounted on a selected one of said beam brackets for locking said tie rod in a predetermined transverse position, said backup lock assembly including a bracket formed with a locking slot mounted on said tie rod, and a lock being mounted on said selected one of said beam brackets, said lock being biased by a coil spring to an unlocked position when an air bag of said assembly is deflated, and in which upon inflation of said air bag with compressed air, said lock overcomes said spring bias and engages said locking slot to cause said steering assemblies to maintain said axle spindles substantially in alignment with said axle tube during said backup operation of the vehicle and when said axle/suspension system is in a lifted position.

\* \* \* \* \*

UNITED STATES PATENT AND TRADEMARK OFFICE
CERTIFICATE OF CORRECTION

| | | |
|---|---|---|
| PATENT NO. | : 7,131,652 B2 | Page 1 of 1 |
| APPLICATION NO. | : 10/683634 | |
| DATED | : November 7, 2006 | |
| INVENTOR(S) | : John Edward Ramsey | |

It is certified that error appears in the above-identified patent and that said Letters Patent is hereby corrected as shown below:

Column 8, Claim 1, Line 1, insert the word --tube-- after the phrase "--assemblies mounted on said axle"

Column 9, Claim 7, Line 7, insert the word --tube-- after the phrase "--assemblies mounted on said axle"

Signed and Sealed this

Fourth Day of September, 2007

JON W. DUDAS
*Director of the United States Patent and Trademark Office*